(12) United States Patent
Shimodaira et al.

(10) Patent No.: US 7,714,976 B2
(45) Date of Patent: May 11, 2010

(54) OPTICAL RESIN SHEET AND LIQUID CRYSTAL CELL SUBSTRATE INCLUDING THE SAME, LIQUID CRYSTAL DISPLAY DEVICE, SUBSTRATE FOR AN IMAGE DISPLAY DEVICE, AND IMAGE DISPLAY DEVICE

(75) Inventors: Kiichi Shimodaira, Ibaraki (JP); Yoshimasa Sakata, Ibaraki (JP); Yuuzou Akada, Ibaraki (JP); Tadaaki Harada, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 809 days.

(21) Appl. No.: 10/576,583

(22) PCT Filed: Aug. 31, 2004

(86) PCT No.: PCT/JP2004/012538

§ 371 (c)(1),
(2), (4) Date: Apr. 20, 2006

(87) PCT Pub. No.: WO2005/040256

PCT Pub. Date: May 6, 2005

(65) Prior Publication Data

US 2009/0015781 A1 Jan. 15, 2009

(30) Foreign Application Priority Data

Oct. 23, 2003 (JP) ............... 2003-363474
Jul. 22, 2004 (JP) ............... 2004-213713

(51) Int. Cl.
G02F 1/1333 (2006.01)
B32B 27/04 (2006.01)
B32B 27/12 (2006.01)
B32B 17/02 (2006.01)
B32B 17/04 (2006.01)

(52) U.S. Cl. ............ 349/158; 428/299.4; 428/300.7; 442/180

(58) Field of Classification Search ............. 349/158; 442/180; 428/299.4, 300.7
See application file for complete search history.

(56) References Cited

U.S. PATENT DOCUMENTS

| 5,781,264 | A | 7/1998 | Noda et al. |
| 5,814,403 | A | 9/1998 | Anderson et al. |
| 2003/0077453 | A1 | 4/2003 | Oaku et al. |

FOREIGN PATENT DOCUMENTS

CA     2 076 616     3/1993

(Continued)

OTHER PUBLICATIONS

International Search Report of PCT/JP2004/012538, dated Oct. 20, 2004.
International Preliminary Report on Patentability of International Application No. PCT/JP 2004/012538, with Form PCT/ISA/237.

*Primary Examiner*—Uyen-Chau N Le
*Assistant Examiner*—Kajli Prince
(74) *Attorney, Agent, or Firm*—Westerman, Hattori, Daniels & Adrian, LLP

(57) ABSTRACT

An optical resin sheet includes a cured resin layer containing glass fiber, wherein the ratio of the elastic modulus of the glass fiber to the elastic modulus of a cured resin material, which forms the cured resin layer, is 25 or more. With the thus arranged optical resin sheet, stress is applied to the glass fiber, thereby reducing the phenomenon of occurrence of birefringence, and when it is applied to a display device, there is achieved a significantly small light leakage in an oblique direction. The optical resin sheet is capable of achieving excellent display quality of an image display device such as a liquid crystal display device, as well as keeping the coefficient of thermal expansion lower and the mechanical strength higher.

8 Claims, 1 Drawing Sheet

FOREIGN PATENT DOCUMENTS

| | | |
|---|---|---|
| DE | 692 23 013 | 3/1993 |
| EP | 0 532 288 A2 | 3/1993 |
| JP | 5-200888 | 8/1993 |
| JP | 8-327987 | 12/1996 |
| JP | 11-2812 | 1/1999 |
| JP | 2002-365624 * | 12/2002 |
| JP | 2003-033991 * | 2/2003 |
| JP | 2003-33991 A | 2/2003 |
| JP | 2003-050384 | 2/2003 |
| JP | 2003-122269 | 4/2003 |

* cited by examiner

OPTICAL RESIN SHEET AND LIQUID CRYSTAL CELL SUBSTRATE INCLUDING THE SAME, LIQUID CRYSTAL DISPLAY DEVICE, SUBSTRATE FOR AN IMAGE DISPLAY DEVICE, AND IMAGE DISPLAY DEVICE

FIELD OF THE INVENTION

The present invention relates to an optical resin sheet that is used mainly as a substrate for an optical device (an image display device) such as a liquid crystal display device, an organic electroluminescence display device, or the like.

BACKGROUND OF THE INVENTION

In the fields of liquid crystal display devices, organic electroluminescence display devices, etc., it is proposed to use plastic substrates in place of conventional glass substrates for progress in making a display lightweight, low-profile and high impact.

Whilst substrates of the above type are required to have a low coefficient of thermal expansion, plastic substrates may pose a problem of causing misalignment when forming, for example, electrodes or color filters, due to thermal shrinkage and expansion, since plastic has a higher coefficient of linear expansion than glass.

Although those of various active matrix driving types are recently used especially in the field of liquid crystal display devices thanks to the excellent display quality compared with passive matrix driving types, the above problem is more significant in the liquid crystal display devices of the active matrix driving types because they are required to have a lower coefficient of thermal expansion than the passive matrix driving types.

Another problem associated with plastic substrates is that the mechanical strength thereof is relatively low.

In light of the above problems, there is proposed the use of an optical resin sheet that is formed by impregnating a pre-cured resin in glass fiber such as glass cloth and forming it into a sheet (Patent documents 1, 2 referred below).

Patent Document 1: Official Gazette of Japanese Patent Application Laid-open No. 2003-50384

Patent Document 2: Official Gazette of Japanese Patent Application Laid-open No. Hei-11-2812

SUMMARY OF THE INVENTION

Problems to be Solved by the Invention

However, the above conventional optical resin sheets may cause stress birefringence in glass fiber due to curing shrinkage of a resin liquid or cooling shrinkage of a cured resin material after molded, whilst they are excellent in terms of mechanical strength and low coefficient of thermal expansion. This stress birefringence may cause a problem of deteriorating the display quality of an image display device, such as occurrence of light leakage in an oblique direction (light leakage in an oblique viewing azimuth) in a black display mode of, for example, a liquid crystal cell or the like prepared by the use of such a conventional optical sheet as a substrate.

In consideration of the above problem, it is an object of the present invention to provide an optical resin sheet that is capable of achieving excellent display quality of an image display device such as a liquid crystal display device, as well as keeping the coefficient of thermal expansion low and the mechanical strength high, and more particularly an optical resin sheet suitable for use as a plastic substrate for an active matrix display device.

Means of Solving the Problems

The present inventors made intensive studies in order to solve the above problem, found a means of solving the problem and thus achieved the present invention.

Specifically, according to the present invention, there is provided an optical resin sheet, which is characterized by that it comprises a cured resin layer containing glass fiber, in which the ratio of the elastic modulus of the glass fiber to the elastic modulus of a cured resin material of the cured rein layer is 25 or more.

According to the present invention, since the cured resin layer contains glass fiber, it is possible to provide a resin sheet having a lower coefficient of thermal expansion and an excellent mechanical strength compared with a resin sheet containing no glass fiber.

Furthermore, since the ratio of the elastic modulus of the glass fiber to the elastic modulus of the cured resin material, which forms the cured resin layer, is 25 or more, there is a significantly small light leakage in an oblique direction in a black display mode when the present invention is applied to for example a liquid crystal display device, thus achieving for example excellent display quality in the said direction.

In the present invention, by the "elastic modulus" for the cured resin material and the glass fiber is meant a storage elastic modulus measured at 25° C. by a viscoelasticity spectrometer (Rheometric Scientific Ltd., ARES).

Effects of the Invention

As described above, a resin sheet of the present invention has a low coefficient of thermal expansion and excellent mechanical strength, and when it is applied to for example a liquid crystal display device, it is possible to produce an effect of providing an image display device with excellent display quality, such as excellent display quality in an oblique direction in a black display mode.

DESCRIPTION OF THE REFERENCE CODES

1: cured resin layer
2: glass cloth

BEST MODE FOR CARRYING OUT THE INVENTION

Description will be made for the embodiments of the present invention with reference to the drawings.

Figure 1:
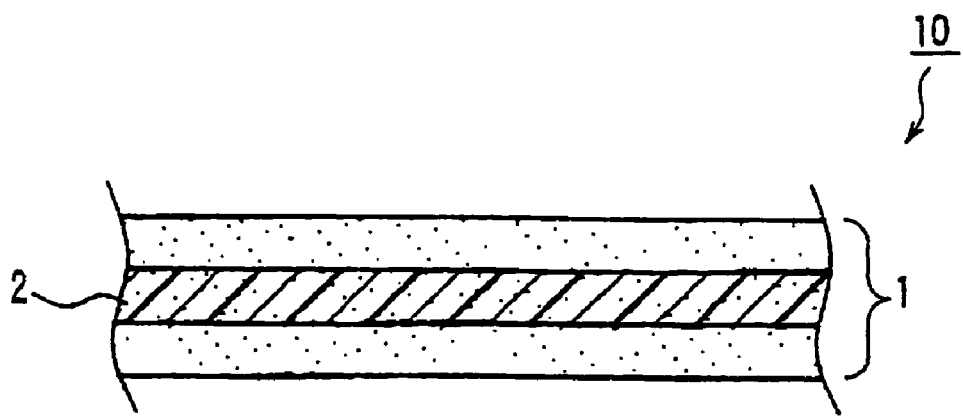
FIG. 1 is a cross sectional view illustrating an optical resin sheet according to one embodiment.

FIG. 1 is a cross sectional view illustrating a preferred embodiment of the present invention.

As illustrated in FIG. 1, a resin sheet 10 of the present invention has a transparent cured resin layer 1 that contains glass fiber 2.

In FIG. 1, the glass fiber is glass cloth 2 having a sheet-like shape formed by, for example, weaving, and this glass cloth 2 is illustrated as being embedded in the cured resin material along the cured resin layer 1 (parallel to the cured resin layer).

The cured resin layer of the present invention is formed by, for example, having resin liquid exist in glass fibers and curing the same. The cured resin layer may be formed by having resin liquid exist in glass fibers by a conventional technique, such as a casting technique, a flow-casting technique, an impregnation technique and a coating technique, and then curing the same. When a curing resin is to be used, a heat curing, ultraviolet curing, electron beam curing or other curing technique may be used alone or in combination. Of them, it is preferable to use as a curing technique a heat curing technique, since the cured resin layer has excellent thermal resistance.

As a resin component of the resin liquid, a thermoplastic resin such as a polyester resin, a polyethylene resin, a polystyrene resin, a polycarbonate resin, a polyamide resin, a polyacetal resin and a polyphenylene sulfide resin, and a curing resin such as a phenol resin, an epoxy resin, a vinylester resin, a polyimide resin, a melamine resin and a urea resin may be used alone or in combination.

Of those resins, a curing resin, particularly an epoxy resin, is preferable since it remains in a liquid state at room temperature when in a pre-cured state.

As an epoxy resin, it is possible to use hitherto known epoxy resins, which include bisphenol types such as bisphenol A type, bisphenol F type, bisphenol S type, and hydrogenated epoxies derived from these; novolak types such as phenol novolak type and cresol novolak type; nitrogen-containing cyclic types such as triglycidyl isocyanurate type and hydantoin type; alicyclic type; aliphatic type; naphthalene type; low-water-absorption type such as glycidyl ether type and biphenyl type; dicyclo type such as dicyclopentadiene; ester type; etherester type; and modifications of these. Of these epoxy resins, preferred epoxy resins from the standpoints of insusceptibility to discoloration, etc., are bisphenol A type epoxy resin, alicyclic type epoxy resin, triglycidyl isocyanulate type epoxy resin and dicyclopentadiene type epoxy resin. These epoxy resins may be used alone or in combination of two or more thereof. More illustratively, from the standpoints of the capability of exhibiting heat resistance, toughness and low birefringence with good balance, the combination of the dicyclopentadiene type epoxy resin and the alicyclic type epoxy resin is preferable.

An example of the bisphenol A type epoxy resin includes an epoxy resin represented by the following formula (1), in which n is, for example, 0 to 2.

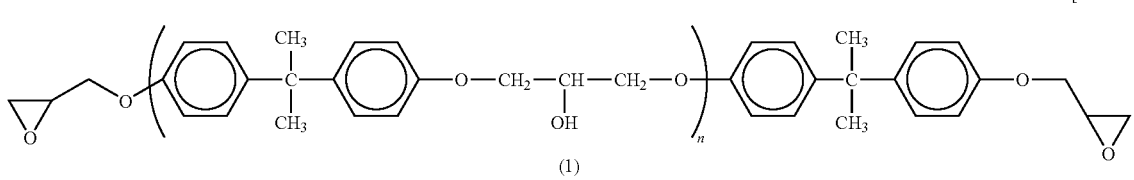

[Formula 1]

(1)

Examples of the alicyclic type epoxy resin include 3,4-epoxycyclohexylmethyl-3,4-epoxycyclohexanecarboxylate represented by the following formula (2), and those represented by the following formula (3). In the formula (3), n represents an integer of 1 to 20 and R represents alkyl group.

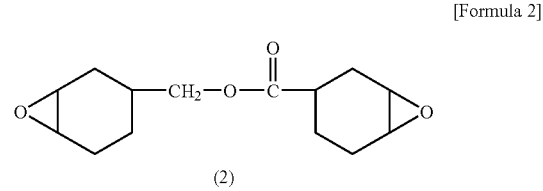

[Formula 2]

(2)

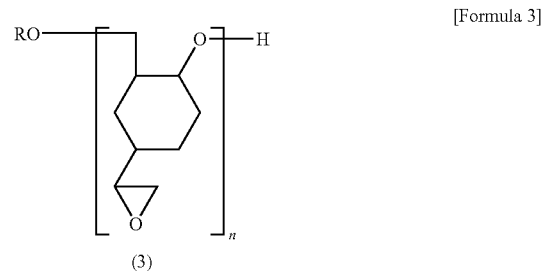

[Formula 3]

(3)

Examples of the dicyclopentadiene epoxy resin (an epoxy resin having the skeleton of dicyclopentadiene) include epoxy resins respectively represented by the following formula (4), (5). In the formula (5), n represents an integer of 1 to 3.

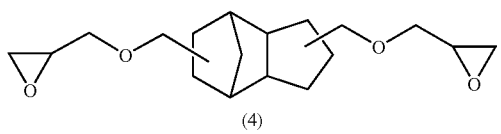

[Formula 4]

(4)

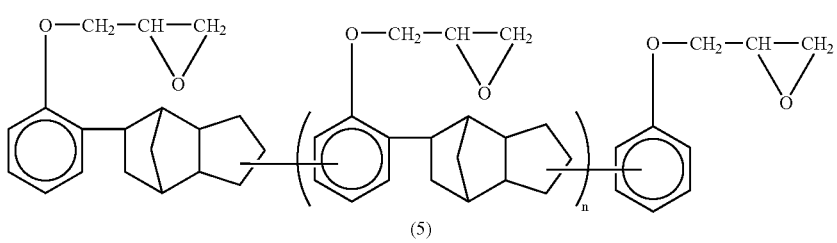

[Formula 5]

(5)

Of the aforesaid epoxy resins, preferable is the epoxy resin represented by the formula (4) or (5). A reason is that the use of these resins makes it possible to control the thicknesswise retardation of a resin sheet to a small value. When the thicknesswise retardation is small, it is possible to suppress light leakage in an oblique direction in a black display mode when the resin sheet is used in a liquid crystal display device. Thus, the display characteristics are further improved.

From the standpoint of improving, for example, the flexibility or strength of a resin sheet to be formed, the epoxy resin preferably has an epoxy equivalent of 100 to 1000 (g/eq) and a softening point of 120° C. or below, and more preferably, an epoxy equivalent of 150 to 500 (g/eq) and a softening point of 80° C. or below. The epoxy resin preferably remains in a liquid state at ordinal temperature (e.g., 5 to 35° C.) with no solvent contained therein.

For forming a resin sheet, it is preferable to use a two-component epoxy resin that remains in a liquid state with no solvent contained therein at a temperature lower than the temperature at which the coating is carried out, or particularly at ordinal temperature, since it is excellent in spreading property and coatability.

A resin liquid that forms the cured resin material may be mixed with various types of additives other than resins according to needs and circumstances.

Examples of the additives include curing agents, curing accelerators, age resistors, modifying agents, surfactants, colorants, pigments, discoloration inhibitors, UV absorbers and photoinitiators.

The resin component is contained in the resin liquid usually in the range from 30 to 100 wt. %, preferably in the range from 40 to 90 wt. % and more preferably in the range from 40 to 80 wt. %. In this description, when the resin liquid contains a solvent, the weight percent of each component represents the weight percent with the weight excluding the solvent being designated as the total weight.

Examples of the curing agent include without limitation organic acid compounds such as tetrahydrophthalic acid, methyltetrahydrophthalic acid, hexahydrophthalic acid and methylhexahydrophthalic acid, and amine compounds such as ethylenediamine, propylenediamine, diethylenetriamine, triethylenetetramine, amine adducts thereof, methaphenylenediamine, diaminodiphenylmethane and diaminodiphenylsulfone. These may be used alone or in combination of two or more thereof.

Further examples of the curing agent include amide compounds such as dicyandiamide and polyamide, hydrazide compounds such as dihydrazide, imidazole compounds such as methylimidazole, 2-ethyl-4-methylimidazole, ethylimidazole, isopropylimidazole, 2,4-dimethylimidazole, phenylimidazole, undecylimidazole, heptadecylimidazole and 2-phenyl-4-methylimidazole, imidazoline compounds such as methylimidazoline, 2-ethyl-4-methylimidazoline, ethylimidazoline, isopropylimidazoline, 2,4-dimethylimidazoline, phenylimidazoline, undecylimidazoline, heptadecylimidazoline and 2-phenyl-4-methylimidazoline, phenol compounds, urea compounds and polysulfide compounds.

In addition, acid anhydrides and the like may be used as the curing agent. These acid anhydrides are preferably used from the standpoints of, for example, discoloration inhibiting characteristics. Examples of these acid anhydrides include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride and chlorendic anhydride. Of these acid anhydrides, it is preferable to use colorless or pale yellow acid anhydride curing agents having a molecular weight of from about 140 to about 200, such as phthalic anhydride, tetrahydrophthalic anhydride, hexahydrophthalic anhydride, methylhexahydrophthalic anhydride or methyl nadic anhydride.

When an epoxy resin is used as the resin component of the resin liquid and an anhydride curing agent is used as the curing agent, the epoxy resin and the curing agent are mixed in the proportion of, for example, without limitation, preferably 0.5 to 1.5 acid anhydride equivalents and more preferably 0.7 to 1.2 acid anhydride equivalents, per equivalent of the epoxy group. With the anhydride curing agent mixed in proportion of 0.5 or more equivalents, the color tint after curing is more significant, and with 1.5 equivalents or less, satisfactory moisture resistance can be kept. In a case where a different curing agent is used, or two or more types of the curing agents are used, it is possible to mix them according to the aforesaid equivalent ratio.

Examples of the curing accelerator include without limitation tertiary amines, imidazoles, quaternary ammonium salts, quaternary phosphonium salts, organic metal salts, phosphorus compounds and urea compounds. Of them, tertiary amines, imidazoles and quaternary phosphonium salts are preferable. These curing accelerators may be used alone or in combination of two or more thereof.

The amount of the curing accelerator to be added in the resin liquid is not limited to a specific amount, but is determined depending on the type of the resin component or the like. For example, when an epoxy resin is used, the curing accelerator is added in an amount of preferably from 0.05 to 7.0 parts by weight, and more preferably from 0.2 to 3.0 parts by weight, per 100 parts by weight of the epoxy resin. With the curing accelerator added in an amount of 0.05 parts by weight or more, satisfactory curing acceleration effect can be produced, and when in an amount of 7.0 parts by weight or less, it is possible to make the color tint after curing significant.

Examples of the age resistor include without limitation phenol compounds, amine compounds, organic sulphur compounds, phosphine compounds and other hitherto known compounds.

Examples of the modifying agent include without limitation glycols, silicones, alcohols and other hitherto known compounds.

Examples of the surfactant include various types of surfactants such as silicone, acrylic or fluorinated surfactants. Of them, silicone surfactant is preferable. These surfactants are added to smoothen the surface of a resin sheet when the resin sheet is to be formed by curing a resin liquid in contact with air The glass fiber may be any one of continuous filament glass fiber and staple glass fiber. This glass fiber may be contained in the form of staple glass fiber mixed in the cured resin layer, non-woven fabric of staple fiber or filament fiber, or glass cloth (fabric). Of them, the glass fiber is preferably contained in the form of glass cloth from the standpoint of the strength.

The glass cloth is woven, for example, by using yarns formed by twisting about 100 to 800 continuous glass fibers (filaments) each having a circular or elliptical shape in cross section and a maximum cross sectional diameter of 3 to 10 μm, and crossing them to each other as warp or weft yarns.

The weaving may be plain weaving, twill weaving or satin weaving.

The glass cloth has a thickness of generally from 10 to 500 μm and preferably from 15 to 350 μm, at a thickest portion.

Examples of the materials of the glass fiber to be used include soda glass, borosilicate glass and non-alkaline glass. Of them, non-alkaline glass is preferably used in view of the possibility that the alkaline component in glass may cause undesirable effects to a TFT or the like.

In the present invention, the glass fiber is required to have an elastic modulus 25 times or more than 25 times than the elastic modulus of the cured resin material and in general 500 times or less than 500 times than the same.

The elastic modulus is generally in the range from 5 to 500 GPa and preferably in the range from 10 to 200 GPa.

As long as the elastic modulus lies in the above ranges, it is possible to provide the cured resin layer with satisfactorily low coefficient of thermal expansion and excellent mechanical strength.

The glass fiber in the above ranges may be obtained by proper selection of any one having a desirable elastic modulus from hitherto known glass fibers.

In the present invention, various methods as mentioned below may be employed as a specific method for forming the cured resin layer.

For example, it is possible to employ a method including: first placing glass cloth on a flat plate die; then applying a resin liquid on the glass cloth; then introducing them into reduced pressure atmosphere, thereby allowing the resin liquid to be impregnated in the glass cloth; and then subjecting them to a heat treatment, a UV radiation or the like, thereby curing the resin liquid so that a cured resin layer with the glass cloth embedded therein is produced.

Furthermore, it is possible to employ a method of forming a cured resin layer with glass cloth embedded therein by immersing the glass cloth in a resin liquid by impregnation under a condition of an atmospheric pressure and curing the resin liquid while keeping the immersed state.

Still furthermore, it is possible to employ another method that includes placing glass cloth on an endless belt or a base plate and impregnating it with a resin liquid or applying a resin liquid thereto. The resin liquid thus applied or the like may be subjected to a curing treatment such as a heat treatment or a light radiation treatment according to needs and circumstances.

In a case where an epoxy resin, which includes a dicyclopentadiene epoxy resin, is used as a resin component in a resin liquid, it is preferable to carry out a heat treatment at 100 to 200° C. for 10 minutes to 5 hours, although no limitation is intended.

In a case where an epoxy resin is used as a resin component of the resin liquid, the epoxy resin may be dispersed or dissolved in a solvent, thereby providing an epoxy resin liquid for use. Examples of the solvent for use include without limitation methyl ethyl ketone, acetone, methyl isobutyl ketone, toluene, xylene and ethyl acetate. The different resins, various types of additives, etc., as mentioned above, may be appropriately added to an epoxy resin liquid kept in a liquid form without a solvent or an epoxy resin liquid with an epoxy resin dissolved in a solvent.

In the present invention, the proportion of the cured resin material in the cured resin layer (a portion of the cured resin layer excluding the glass fiber) is, for example, from 20 to 80 wt. %, preferably from 25 to 75 wt. % and more preferably from 30 to 70 wt. %. Meanwhile, the proportion of the glass fiber is, for example, from 20 to 80 wt. %, preferably from 25 to 75 wt. % and more preferably from 30 to 70 wt. %.

It is possible to provide a cured resin layer in the above proportion by adjusting the weight proportion of a resin liquid with respect to the total weight of a pre-cured resin liquid and glass fiber to the above ranges. When a resin liquid contains a solvent, the weight of the solvent is excluded from the weight of the resin liquid.

In the present invention, the elastic modulus of a cured resin material (a portion excluding glass fiber), which forms the cured resin layer, is preferably from 0.1 to 1.3 GPa and more preferably from 0.2 to 1.2 GPa.

With the above elastic modulus, it is easy to enable the cured resin material to have an elastic modulus less than $\frac{1}{25}$ (one twenty-fifth) of the elastic modulus of the glass fiber (that is, the ratio of the elastic modulus of the glass fiber to the elastic modulus of the cured resin material is 25 or more), thereby reducing the stress birefringence caused by shrinkage, cooling shrinkage, or the like when curing a resin liquid, and hence enabling the light leakage in an oblique direction in a black display to be significantly small when applied to, for example, a liquid crystal display device.

As a method of enabling the cured resin material to have an elastic modulus $\frac{1}{25}$ (one twenty-fifth) of the elastic modulus of the glass fiber and at the same time have an elastic modulus of a desirable value (e.g., from 0.1 to 1.3 GPa), it can be cited a method that includes limiting cross-linking density to a lower value when a pre-cured resin liquid is cross linked, and a method that includes adding a plasticizer as one component of a pre-cured resin liquid. For limiting cross-linking density to a low value, a step of adding a reaction diluent as one component of a pre-cured resin liquid may be employed.

In a case where a cured resin material is produced by heat-curing, steps of lowering the curing temperature, shortening the heating time, decreasing the amount of a curing accelerator, and the like may be employed alone or in combination.

In a case where a cured resin material is produced by ultraviolet curing, electron beam curing or the like, steps of lowering the density of an initiator or a sensitizer, reducing ultraviolet radiation or electron beam radiation, and the like may be employed alone or in combination.

In these steps, the elastic modulus of a cured resin material may be set at a desirable value (e.g., from 0.1 to 1.3 GPa) by appropriately adjusting the amount added, the curing temperature, the irradiation time or the like.

In the present invention, the absolute value of the difference in average refractive index between the cured resin material and the glass fiber is preferably from 0 to 0.01, more preferably from 0 to 0.008, and still more preferably from 0 to 0.006. The absolute value is preferably equal to or less than 0.01, since interface scattering between the glass cloth and the cured resin material can be satisfactorily suppressed, the haze of a resin sheet can be decreased, and hence the original transparency of a cured resin layer can be satisfactorily maintained.

The difference of the refractive index may be adjusted by, for example, adjusting the mixing ratio of each component in a resin liquid.

Herein, the average refractive indices of glass fiber and a cured resin material can be measured independently each other, using a sheet of only glass fiber and a sheet of only a cured resin material separately formed, by use of an Abbe refractometer at 25° C. and 589 nm.

The average refractive index represents an average value of nx, ny and nz. In this, nx, ny and nz respectively represent refractive indices in directions of an X axis, a Y axis and a Z axis in each sheet. The X axis is an axis that gives a maximum in-plane refractive index in each sheet, the Y axis is an in-plane axis perpendicular to the X axis, and the Z axis is an axis perpendicular to the plane.

The average refractive indices of the cured resin material and the glass fiber each are preferably 0.01 or lower.

For enabling the cured resin material to have an average refractive index of 0.01 or lower, a step of adjusting the mixing ratio of each additive (e.g., a curing agent, etc.) mixed in a resin liquid.

The in-plane retardation of the cured resin layer is preferably 2 nm or smaller, more preferably from 0 to 1 nm, and still more preferably from 0 to 0.8 nm.

With the in-plane retardation being 2 nm or smaller, it is possible to further enhance the contrast of an image display device, and particularly the contrast in an oblique direction, and hence achieve excellent display quality, when used as a substrate of a liquid crystal cell or a substrate of an organic EL display device.

The thicknesswise retardation of the cured resin layer is preferably 40 nm or smaller, more preferably from 0 to 20 nm, and still more preferably from 0 to 10 nm. With the thicknesswise retardation being 40 nm or smaller, it is possible to satisfactorily suppress the light leakage in an oblique direction, further enhance the contrast in an oblique direction and hence achieve more excellent display quality, when applied to an image display device, as mentioned above. In a case where the thicknesswise retardation is set at 40 nm or smaller, and particularly at 20 nm or smaller, it is particularly preferable to use, as a resin component, an epoxy resin represented by the aforesaid formula (4) or (5).

The in-plane retardation ($\Delta$nd) and the thicknesswise retardation (Rth) are respectively represented by the following formula. In the following formula, nx, ny and nz respectively represent refractive indices in an X axis, a Y axis and a Z axis, of the cured resin layer, and d represents the thickness of the cured resin layer. Herein, the X axis is an axis that gives a maximum in-plane refractive index in the cured resin layer, the Y axis is an in-plane axis perpendicular to the X axis, and the Z axis represents an axis perpendicular to the plane.

$$\Delta nd=(nx-ny)\cdot d$$

$$Rth=(nx-nz)\cdot d$$

The thickness of the cured resin layer is not necessarily limited to a specific value, but is preferably in the range of, for example, from 20 to 800 µm. This is because when the thickness is 20 µm or more, it is possible to maintain satisfactory strength and stiffness; and when the thickness is 800 µm or less, it is possible to satisfactorily achieve low profile and light weight. The aforesaid thickness is more preferably from 30 to 500 µm and still more preferably 50 to 300 µm.

An optical resin sheet of the present invention preferably has a coefficient of linear expansion being equal to or less than $3.00\times10^{-5}/°$ C. at a temperature from 25° C. to 160° C. When equal to or less than this value for a resin sheet of the present invention, which is used as, for example, a liquid crystal cell substrate on which a color filter, an electrode, etc., are formed, it is possible to satisfactorily suppress misalignment or the like due to thermal expansion therebetween, and hence more easily form a color filter, etc. The coefficient of linear expansion is more preferably equal to or less than $2.00\times10^{-5}/°$ C., and still more preferably equal to or less than $1.5\times10^{-5}/°$ C.

The coefficient of linear expansion is determined by obtaining a TMA measured value by the TMA method specified in JIS K-7197 and substituting it into the following expression. In the following expression, $\Delta Is(T_1)$ and $\Delta Is(T_2)$ represent TMA measured values (µm) respectively obtained at a temperature $T_1$(° C.) and a temperature $T_2$(° C.), at which the measurement is carried out, and $L_0$ represents a length (mm) of an object to be measured, at a room temperature of 23° C.

$$\text{Thermal expansion coefficient}=[1/(L_0\times10^3)]\cdot[(\Delta Is(T_2)\cdot\Delta Is(T_1))/(T_2-T_1)]$$

An optical resin sheet of the present invention has a haze value of preferably 10% or lower, more preferably 3% or lower and still more preferably 2% or lower. The haze value is measured according to JIS K 7136. Specifically, the measurement is carried out by using a commercially available hazemeter (e.g., HM-150, trade name; manufactured by Murakami Color Research Laboratory).

Furthermore, the resin sheet has a light transmittance of preferably 88% or higher, more preferably 90% or higher and still more preferably 92% or higher. When the light transmittance is 88% or higher, it is possible to provide more crisp characters or images in various types of image display devices, and thus achieving more excellent display quality, when those image display devices each are assembled by using the resin sheet as a substrate of a liquid crystal cell, a substrate of an organic EL device, or the like. The light transmittance can be determined by, for example, measuring a total transmittance of light rays with a wavelength of 550 nm, using a high-speed spectrophotometer.

At least one surface of an optical resin sheet of the present invention is preferably smooth. When the surface is smooth, it is possible to more easily form an alignment film, a transparent electrode or the like on the surface in a case where it is used for example as a liquid crystal cell substrate. Specifically, the at least one surface preferably has a surface roughness (Rt) of, for example, 2 μm or smaller. Herein, the "surface roughness" represents a difference between a maximum value and a minimum value, which are obtained by measurement using a stylus type surface roughness meter (e.g., P-11, trade name, manufactured by KLA-Tencor Ltd.) under a condition of a long wavelength cut-off of 800 μm, a short wavelength cut-off of 250 μm, and an evaluation length of 10 mm.

Figure 2:
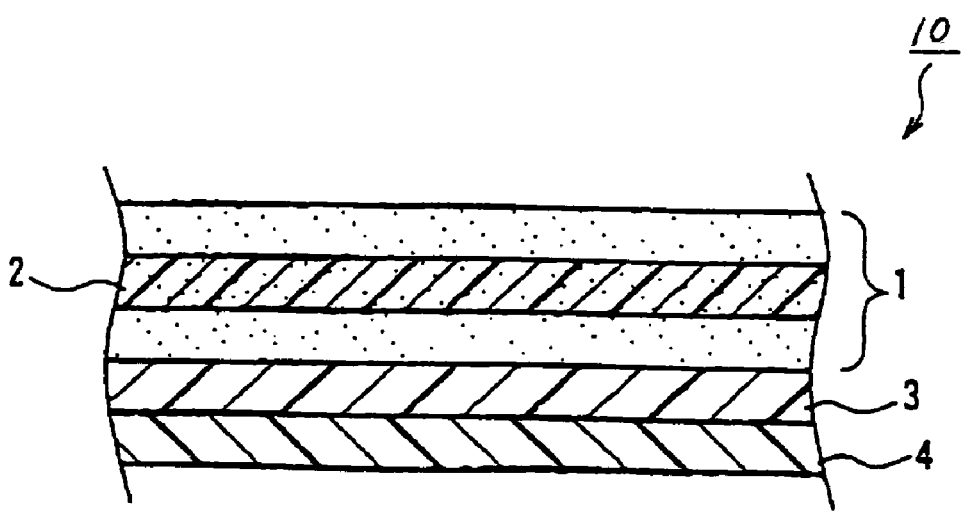
FIG. 2 is a cross sectional view illustrating an optical resin sheet according to another embodiment.

An optical resin sheet of the present invention is preferably a laminated body further including, in addition to the cured resin layer containing glass fiber, at least one of a hard-coat layer and a gas barrier layer. Particularly, as illustrated in FIG. 2, the optical resin sheet is preferably a laminated body including both a hard-coat layer 4 and a gas barrier layer 3 with the hard-coat layer laminated as an outermost layer. With the hard-coat layer laminated as the outermost layer, it is possible to improve abrasion resistance, impact resistance, chemical resistance, etc. In various types of image display devices, when moisture or oxygen passes through a liquid crystal cell substrate and enters the inside the liquid crystal cell, the quality of a liquid crystal changes and bubbles are formed, which may cause deterioration in appearance, breakage of a conductive film pattern, or the like; but the gas barrier layer as laminated can prevent such passing-through of gas such as moisture and oxygen. The hard-coat layer and the gas barrier layer may be laminated on either side or both are laminated on each of both sides.

A laminated body containing a hard-coat layer, as the optical resin sheet, may be manufactured, for example, by first forming a hard-coat layer on a base such as a flat plate die or an endless belt of stainless steel, then placing glass cloth on the hard-coat layer, then forming a cured resin layer in the manner as mentioned above, thus producing a laminated body, and removing the same from the base. Alternatively, the laminated body may be manufactured by first forming a hard-coat layer on a base by a flow-casting technique, a coating technique or the like, and then laying the hard-coat layer on a cured resin layer with glass cloth embedded therein.

Examples of the method of forming the hard-coat layer include without limitation a method which involves mixing a hard-coat-layer forming material in a solvent, thereby preparing a coating liquid, then applying it on a base, and then curing the same by drying. According to needs and circumstances, a heat treatment or a light radiation treatment may be carried out. Examples of the method of coating on the base include without limitation a roll coat method, a spin coat method, a wire bar coat method, a dip coat method, an extrusion method, a curtain coat method, a spray coat method and other hitherto known methods.

Examples of a material for forming the hard-coat layer include without limitation urethane resins, acrylic resins, polyester resins, polyvinyl alcohol resins such as polyvinyl alcohol, ethylene vinyl alcohol copolymer and the like, vinyl chloride resins, and vinylidene chloride resins. Further, for example, polyarylate resins, sulfone resins, amide resins, imide resins, polyether sulfone resins, polyether imide resins, polycarbonate resins, silicone resins, fluoro resins, polyolefin resins, styrene resins, vinylpyrrolidone resins, cellulose resins, acrylonitrile resins and the like may be used, as well. Of these materials, urethane resins are preferably used, and urethane acrylate is more preferably used. These types of resins may be used alone or in the form of a blend of two or more types.

Although no limitation is intended, the thickness of the hard-coat layer is generally from 0.1 to 50 μm, preferably from 0.5 to 8 μm, and still more preferably from 2 to 5 μm.

A hard-coat layer, which is generally formed on a base, is easy to be removed from the base and further prevented from cracking due to the removal, provided that it has a thickness in the above ranges.

A laminated body as an optical resin sheet, having a gas barrier layer as well as the hard-coat layer may be manufactured by, for example, first forming a gas barrier layer on the hard-coat layer formed in the manner as mentioned above, and then forming a cured resin layer with glass cloth embedded therein in the manner as mentioned above. A method of forming the gas barrier layer is not limited to a specific method, but hitherto known methods may be appropriately employed.

The gas barrier layer is categorized into, for example, an organic gas barrier layer and an inorganic gas barrier layer. Examples of a material for forming the organic gas barrier layer include without limitation vinyl alcohol polymers such as polyvinyl alcohol and a partially saponified product thereof, and ethylene vinyl alcohol copolymer; and materials with low oxygen-permeability such as polyacrylonitrile and polyvinylidene chloride. Of these materials, vinyl alcohol polymers are particularly preferably used from the standpoint of their high gas barrier properties.

From the standpoints of, for example, functionality in terms of transparency, prevention of coloration, gas barrier properties and the like, as well as reduction in thickness, flexibility of a resulting resin sheet and the like, the thickness of the organic gas barrier layer is, preferably 10 μm or smaller, more preferably from 2 to 10 μm, and still more preferably from 3 to 5 μm. In the resin sheet, with the thickness being 10 μm or smaller, a lower yellow color index (YI value) may be maintained, and with the thickness being 2 μm or greater, satisfactory gas barrier performance can be maintained.

Meanwhile, as a material for forming the inorganic gas barrier layer, for example, transparent materials such as silicon oxides, magnesium oxides, aluminum oxides, zinc oxides and the like may be used. Of these materials, silicon oxides and silicon nitrides are preferably used from the standpoints of, for example, their excellent gas barrier properties, adhesion to a substrate layer and the like.

Preferably, the silicon oxides have, for example, a ratio of the number of oxygen atoms to the number of silicon atoms of 1.5 to 2.0 for the following reason. That is, with this ratio, the inorganic gas barrier layer is improved further in terms of, for example, gas barrier properties, transparency, surface flatness, bending properties, membrane stress, cost, and the like.

The silicon nitrides preferably have a ratio (Si:N) of the number of nitrogen atoms (N) to the number of silicon atoms (Si) of 1:1 to 3:4.

Although no limitation is intended, the inorganic gas barrier layer has a thickness preferably in the range of, for example, 5 to 200 nm. With the thickness being 5 nm or greater, for example, more excellent gas barrier properties can be obtained, and with the thickness being 200 nm or smaller, the inorganic gas barrier layer is improved also in terms of transparency, bending properties, membrane stress, and cost.

When an optical resin sheet of the present invention is a laminated body, its thickness, which varies depending on the number of layers laminated, is preferably for example from 20 to 800 μm, more preferably from 30 to 500 μm, and still more preferably from 50 to 300 μm. Only a single cured resin layer or two or more cured resin layers, with glass fiber embedded therein, may be contained in the thus arranged optical resin sheet.

An optical resin sheet of the present invention may be used for various applications, and used, for example, as substrates of liquid crystal display devices, EL display devices, solar batteries, etc.

An optical resin sheet of the present invention may be used, for example, for a liquid crystal display device that is generally made up of a liquid crystal cell substrate for supporting liquid crystal, and a polarizing plate and a reflector or a backlight, etc., laminated on the liquid crystal cell substrate on each of a visible side and a non-visible side, and more specifically used as a liquid crystal cell substrate on each of the visible side and the non-visible side of the thus arranged liquid crystal display device. Meanwhile, an optical resin sheet of the present invention may be used for an EL display device that is generally made up of a transparent substrate (a substrate for an EL display), a transparent electrode on the back side of the transparent substrate, an organic ruminant layer, which contains an illuminant (an organic electro luminescence illuminant) and a metal electrode, those being laminated in this order, and more specifically used as a transparent substrate of the thus arranged EL display device.

EXAMPLES

Example 1

An epoxy resin composition (a resin liquid) was prepared by stirring and mixing: as resin components, 50 parts by weight (hereinafter referred only to parts) of 3,4-epoxycyclohexylmethyl-3,4-epoxycyclohexane carboxylate represented by the aforesaid formula (2) and 50 parts of a dicyclopentadiene epoxy resin (epoxy equivalent of 190) represented by the aforesaid formula (6); as a curing agent, 108 parts of methyl nadic anhydride represented by the following formula (7); and as a curing accelerator, 0.95 parts of tetra-n-butylphosphonium o,o-diethylphosphorodithioate represented by the following formula (8).

Then, the above epoxy resin composition was impregnated into glass cloth ("WLT116F", trade name; manufactured by Nitto Boseki Co., Ltd.) and left to stand for 10 minutes under a condition of a reduced pressure (200 Pa).

Then, a coating liquid, which was prepared by dissolving 17 parts of urethane acrylate represented by the following formula (9) and 5 parts of a photo initiator ("Irgacure 184", trade name; manufactured by Ciba Specialty Chemicals) in 100 parts of toluene, was applied on a glass plate by a wire bar coat method, then air-dried, and then cured by using a UV curing device. The curing was made under conditions of at 200 mJ/cm$^2$ for 1 minute, using a high-pressure mercury vapor lamp. Thus, a hard-coat layer having a film thickness of 2 μm was formed. Then, the glass cloth with the epoxy resin composition impregnated thereinto was laid on the hard-coat layer, and this was heated at 120° C. for 1 hour to cure the epoxy resin composition, thereby forming a cured resin layer, and then the removal was made from the glass plate. Thus, an optical resin sheet having a thickness of 100 μm was obtained.

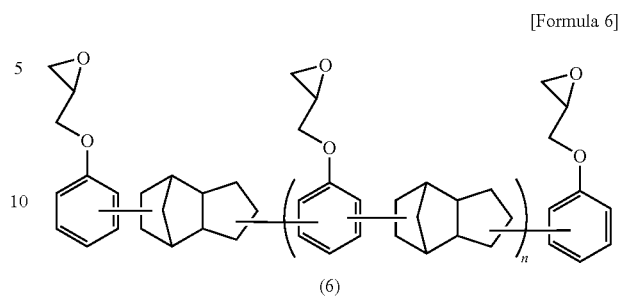

[Formula 6]

(6)

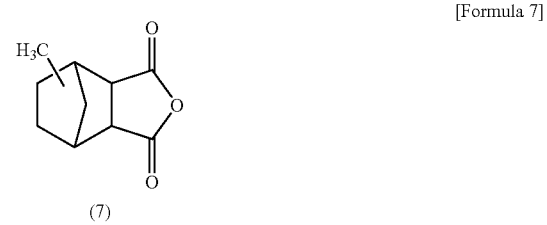

[Formula 7]

(7)

[Formula 8]

(8)

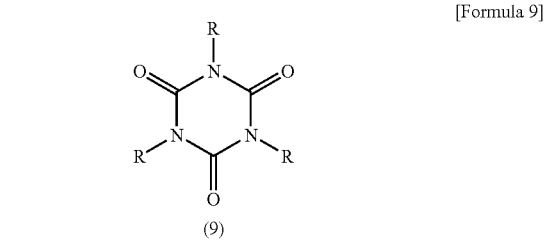

[Formula 9]

(9)

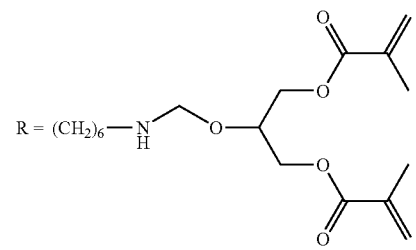

Example 2

An optical resin sheet was obtained in the same manner as in Example 1, except that heating was performed at 125° C. for 1 hour so as to cure an epoxy resin composition.

Example 3

An optical resin sheet was obtained in the same manner as in Example 1, except that heating was performed at 130° C. for 1 hour so as to cure an epoxy resin composition.

Comparative Example 1

An optical resin sheet was obtained in the same manner as in Example 1, except that heating was performed at 140° C. for 1 hour so as to cure an epoxy resin composition.

Comparative Example 2

An optical resin sheet was obtained in the same manner as in Example 1, except that heating was performed at 150° C. for 1 hour so as to cure an epoxy resin composition.

Test Example 1

The epoxy resin compositions of Examples 1 to 3, and Comparative Examples 1, 2 were formed and cured into sheets, each having a thickness of 0.4 mm under the corresponding cured conditions of Examples 1 to 3, and Comparative Examples 1, 2, and the storage elastic modulus of each composition was measured at 25° C. by a viscoelasticity spectrometer (Rheometric, ARES). The storage elastic modulus of the glass fiber was measured in the same manner at 25° C. Thus, the ratio of the elastic modulus of the glass fiber to the elastic modulus of the cured epoxy material was calculated.

The respective results are shown in Table 1.

Test Example 2

A polarizing plate was laid on one side of each of the optical resin sheets in an orientation set at 0° with respect to the weft of the glass cloth, and another polarizing plate was laid on the opposite side thereof with the absorption axes of these polarizing plates oriented orthogonal to one another, thus preparing test pieces. A diffused light was incident on one side of each test piece and whether light leakage in lattice-like pattern exists or not was confirmed based on visual observation from another side.

The visual observation was performed from a normal direction (front side) and from a direction inclined by 45° from the normal line (a direction of gradient), of each test piece.

The respective results are shown in Table 1.

Table 1

| | Epoxy Curing Condition | Cured Epoxy Material (GPa) | Glass Fiber (GPa) | Glass Fiber/ Epoxy | Lattice-like Light Leakage Front | Lattice-like Light Leakage Gradient |
|---|---|---|---|---|---|---|
| Example 1 | 120° C. × 1 h | 0.4 | 27.4 | 68.5 | Nil | Nil |
| Example 2 | 125° C. × 1 h | 0.7 | 27.4 | 39.1 | Nil | Nil |
| Example 3 | 130° C. × 1 h | 1.0 | 27.4 | 27.4 | Nil | Nil |
| Comparative Example 1 | 140° C. × 1 h | 1.4 | 27.4 | 19.6 | Nil | Observed |
| Comparative Example 2 | 150° C. × 1 h | 1.8 | 27.4 | 15.2 | Nil | Observed |

As is apparent from Table 1, lattice-like light leakage was not observed based on visual observation from any one of the front direction and the gradient direction for the test pieces using the optical resin sheets of Examples 1-3. Accordingly, it was confirmed that a good display quality can be achieved. Meanwhile, lattice-like light leakage was observed based on visual observation from the gradient direction for the test pieces using the optical resin sheets of Comparative Examples 1, 2.

The invention claimed is:

1. An optical resin sheet comprising a cured resin layer containing glass fiber, wherein an elastic modulus of a cured resin material which forms the cured resin layer is from 0.1 to 1.3 GPa,
   the ratio of the elastic modulus of the glass fiber to the elastic modulus of the cured resin material, which forms the cured resin layer, is 25 or more, and
   the elastic modulus of each of the glass fiber and the cured resin material is a storage elastic modulus measured at 25° C.

2. An optical resin sheet according to claim 1, wherein the glass fiber contained in the cured resin layer is in the form of glass cloth.

3. An optical resin sheet according to claim 1, further comprising a hard-coat layer.

4. An optical resin sheet according to claim 1, further comprising a gas barrier layer.

5. A liquid crystal cell substrate containing the optical resin sheet according to claim 1.

6. A liquid crystal display device comprising the liquid crystal cell substrate according to claim 5.

7. A substrate for an image display device comprising the optical resin sheet according to claim 1.

8. An image display device comprising the substrate for an image display device according to claim 7.

* * * * *